UNITED STATES PATENT OFFICE.

THORBURN BRAILSFORD ROBERTSON, OF BERKELEY, CALIFORNIA.

GROWTH-CONTROLLING SUBSTANCE DERIVED FROM THE ANTERIOR LOBE OF THE PITUITARY GLAND AND PROCESS FOR PRODUCING THE SAME.

1,218,472.     Specification of Letters Patent.     Patented Mar. 6, 1917.

No Drawing.     Application filed October 8, 1915. Serial No. 54,774.

*To all whom it may concern:*

Be it known that I, THORBURN BRAILSFORD ROBERTSON, a subject of the King of England, residing at Berkeley, in the county of Alameda and State of California, have invented a certain new and useful Growth-Controlling Substance Derived from the Anterior Lobe of the Pituitary Gland and Processes for Producing the Same, of which the following is a specification.

My invention relates to pharmaceutical or medicinal substances and compounds and to their preparation.

It consists in a novel substance derived from the anterior lobe of the pituitary gland (hypophysis cerebri) of oxen, sheep, horses goats or other animals; and in the novel method of its preparation, as will be hereinafter fully described.

This substance exerts when administered by mouth or hypodermically or intra-venously a marked influence upon the growth and nutrition of animals and upon functions related to or involving the growth or repair or multiplication or nutrition of living cells or tissues.

It may be employed as a substitute for pituitary gland, whenever the administration of the anterior lobe of the pituitary gland is indicated for the treatment of diseases of growth or nutrition, or for other purposes requiring an influence similar to that of the anterior lobe of the pituitary gland upon the growth or repair or multiplication or nutrition of cells or tissues. Being devoid of deleterious physiological actions the substance may be administered in relatively larger doses than the whole gland.

The substance is prepared as follows:— The anterior lobes of the pituitary glands of oxen, sheep, horses, goats or other animals are dissected as free as possible from the surrounding connective-tissue capsules and from the posterior lobes and the parts which connect the two lobes of the glands. The anterior lobes thus prepared are minced or ground up into fragments and dried by any suitable method, such, for example, as that of grinding them up with three times their weight of a mixture of equal parts by weight of anhydrous calcium and sodium sulfates, and heating the mixture over boiling water or steam, until it is white and easily powdered. The dried tissue is thoroughly powdered, and extracted with anhydrous ethyl alcohol at or near to the temperature of boiling ethyl alcohol. The alcoholic extract which is thus obtained is concentrated by boiling under reduced pressure until solid material begins to separate out on cooling. To the concentrated extract which is thus obtained is added one and one-half times its volume of anhydrous ethyl ether. The precipitate which forms is separated from the fluid by filtration or decantation, washed in a mixture of one volume of anhydrous ethyl alcohol and one and one-half volume of anhydrous ethyl ether and is then rapidly dried at a low temperature and in the absence of aqueous vapor.

The distinctive properties of the substance may be described as follows:—the substance, when pure, is white or pale cream-colored and readily powdered. It rapidly absorbs aqueous vapor when exposed to damp air and becomes moist and darkens in color.

When heated the substance begins to darken at a temperature lying between 100 degrees centigrade and 110 degrees centigrade. When heated to still higher temperatures the substance progressively darkens and softens as the temperature rises.

The substance contains one and four-tenths of one per cent. of phosphorus, and nitrogen in the proportion of four atoms of nitrogen for every atom of phosphorus. The substance is soluble in water, in ethyl alcohol, in ethyl ether, in chloroform and in carbon tetrachlorid. It is insoluble in a mixture of one part by volume of anhydrous ethyl alcohol and one and one-half parts by volume of anhydrous ethyl ether.

When dissolved in chloroform or in carbon tetrachlorid and treated with Wijs' solution (consisting of 9.4 grams of iodin trichlorid and 7.2 grams of iodin dissolved in sufficient glacial acetic acid to make the volume of the mixture one liter) the substance absorbs about 33 per cent. of its weight of iodin. On standing in the presence of moisture the iodin-absorption value of the substance decreases.

The aqueous solutions of the substance are faintly acid in reaction, and one gram of the substance, dissolved in 200 cubic centimeters of water, requires the addition of about eleven milligrams of potassium hydroxid to render the solution neutral to phenolphthalein.

When saponified by boiling for several hours in aqueous potassium hydroxid solution containing about 30 grams of potassium hydroxid per liter of solution, after the addition of sufficient alcohol to the resultant mixture to render the final concentration of alcohol after neutralization of the excess of potassium hydroxid about 50 per cent., it is found that the saponification products of one gram of the substance have neutralized about 98 milligrams of potassium hydroxid, employing phenolphthalein as the indicator of neutrality.

When the substance, in aqueous solution, is treated with an excess of sodium nitrite and acetic acid it liberates free nitrogen equivalent to one-half of the total nitrogen which is contained in the substance.

When several volumes of a saturated aqueous solution of barium hydroxid are added to a concentrated aqueous solution of the substance a bulky flocculent precipitate appears in the mixture. This dissolves on heating, forming a yellow solution and simultaneously a granular precipitate. After boiling the mixture for a prolonged period and then treating it with an excess of sodium nitrite and acetic acid, a volume of nitrogen is liberated which is equivalent to three fourths of the total nitrogen contained in the substance.

On adding to an aqueous solution of the substance a small amount of copper sulfate and a large excess of potassium or sodium hydroxid no pink or violet color appears in the mixture.

On adding to an aqueous solution of the substance a very small amount of Millon's reagent (a mixture of mercurous and mercuric nitrates in nitric acid solution prepared by dissolving metallic mercury in twice its own weight of nitric acid of specific gravity 1.42, adding to this mixture twice its volume of distilled water, allowing it to stand for 24 hours and then filtering) a precipitate appears which turns pink on heating. This color is discharged by adding an excess of the reagent.

On adding to an equeous solution of the substance an excess of Fehling's solution (an alkaline solution of cupric sulfate and boiling the mixture, no precipitation of cuprous oxid occurs. Nor is any such precipitation observed if the substance, before boiling with Fehling's solution, is first saponified by prolonged boiling in barium hydroxid solution followed by subsequent prolonged boiling in dilute sulfuric acid solution.

On adding to an aqueous solution of the substance an equal volume of a 2 per cent. solution of paradimethylaminobenzaldehyde in hydrochloric acid of specific gravity 1.17 a pink coloration appears in the mixture on standing. This color is also given by the substance after prolonged preliminary boiling in barium hydroxid solution, but is no longer given after preliminary boiling in barium hydroxid solution followed by boiling in dilute sulfuric acid solution.

When chlorin is very cautiously added to an aqueous solution of the substance, either before or after saponification by boiling in barium hydroxid solution or by boiling successively in barium hydroxid solution and in dilute sulfuric acid solution, a pink coloration appears in the mixture which is destroyed by a very slight excess of chlorin. If the solution of the substance or of the saponification products resulting from boiling the substance in barium hydroxid solution or in barium hydroxid solution followed by dilute sulfuric acid solution be saturated with chlorin gas and boiled for a few minutes and the mixture thus obtained is evaporated to dryness and then exposed to the vapors of ammonia, warmed and allowed to stand the deposit is stained red.

When the substance in aqueous solution either before or after saponification by boiling in barium hydroxid solution or by boiling successively in barium hydroxid solution and in dilute sulfuric acid solution is boiled with nitric acid and the resulting mixture evaporated to dryness a yellow residue is left which, on exposure to the vapors of ammonia, becomes a deeper yellow.

When the substance is heated with strong sulfuric acid and sugar no red or violet color is developed.

The mixed decomposition-products of the substance obtained by boiling the substance in aqueous barium hydroxid solution and subsequent removal of the excess of barium hydroxid by means of carbon dioxid contain, among other products, the following:—

Firstly, as mentioned above, a precipitate which resembles a compound of a fatty acid with barium or of a mixture of fatty acids with barium in its insolubility in water and its ability to blacken osmic acid solution when warmed.

Secondly, a product which, after concentration of the solution by evaporation at the temperature of boiling water and removal of the barium carbonate which is precipitated thereby, is precipitated by the addition to the concentrated solution of several times its volume of ethyl alcohol. This product is soluble in water and is precipitated from its aqueous solution by alcohol or by lead acetate. When the dry product is exposed to moist air it absorbs water very rapidly. When ignited this product yields a residue of barium phosphate. This product also yields Scherer's reaction for inosite, namely a bright red coloration when the substance is dissolved in nitric acid solution of specific gravity 1.2, an equal volume of 10 per cent. calcium chlorid solution and the same volume of a one per cent. solution of platinum chlorid are added and the mixture is evaporated to dryness in a porcelain dish and heated.

The mixed decomposition products of the substance obtained by prolonged boiling of the substance in aqueous barium hydroxid solution followed by prolonged boiling in dilute sulfuric acid solution, after removal of the excess sulfuric acid by means of barium hydroxid and removal of the excess of barium hydroxid by carbon dioxid, yield, upon the careful addition of lead acetate solution, a precipitate which redissolves if too much lead acetate is added. After removal of this precipitate the mixture yields a further precipitate upon the addition of basic lead acetate solution (prepared according to the directions contained in the eighth decennial revision of the *Pharmacopœia of the United States* for the preparation of liquor plumbi subacetatis). This latter precipitate, when suspended in water and treated with hydrogen sulfid, yields a product which resembles inosite (hexaoxyhexahydrobenzol) in the following particulars:—

It is soluble in water and is precipitated from its aqueous solution in the form of white acicular crystals by the addition of several volumes of ethyl alcohol followed by the addition of a sufficient volume of ethyl ether to render the mixture cloudy. These crystals, when washed in alcohol and ether, dried and heated, melt at a temperature near to 225 degrees centigrade.

The aqueous solution of the crystals, when evaporated to dryness with a small quantity of mercuric nitrate, yields, upon heating the residue, a red color which disappears on cooling and reappears on heating.

When a few of the crystals are dissolved in a drop or two of nitric acid of specific gravity 1.2 and an equal volume of a 10 per cent. solution of calcium chlorid and the same volume of a 1 per cent. solution of platinum chlorid are added to this solution and the mixture is evaporated to dryness and the residue heated, a rose-red color appears which disappears on cooling and reappears with a bluish tinge on re-heating.

I claim:—

1. The process for the production of the herein described substance which consists in reducing to fragments and drying the anterior lobes of the pituitary glands of animals; then making an alcoholic extract of the same; then adding to said extract substantially one and one-half times its volume of anhydrous ethyl ether to form a precipitate; then separating said precipitate and washing the same in a mixture of one volume of anhydrous ethyl alcohol and one and a half volumes of anhydrous ethyl ether; and finally drying it.

2. The process for the production of the herein described substance which consists in reducing to fragments the anterior lobes of the pituitary glands of animals; then grinding said fragments with a mixture of anhydrous calcium and sodium sulfates; then drying the ground mixture by the application of heat until it is light colored and easily powdered; then powdering the same and making an extract thereof with anhydrous ethyl alcohol at or near the boiling point of said alcohol; then concentrating said extract by boiling under reduced pressure until solid material begins to separate out on cooling; then adding to said concentrated extract substantially one and one-half times its volume of anhydrous ethyl ether to form a precipitate; then separating said precipitate and washing the same in a mixture of one volume of anhydrous ethyl alcohol and one and a half volumes of anhydrous ethyl ether; and finally drying it at low temperature in the absence of aqueous vapor.

3. As a new product, a substance derived from the anterior lobe of the pituitary gland of animals, said substance containing substantially one and four-tenths per cent. of phosphorus, and nitrogen in the proportion substantially of four atoms of nitrogen for every atom of phosphorus; yielding when treated with excess of sodium nitrite and acetic acid a volume of free nitrogen substantially equivalent to one half of the total nitrogen contained in said substance; yielding when decomposed by boiling in barium hydroxid solution followed by boiling in dilute sulfuric acid solution a product which resembles inosite; soluble in water, in ethyl alcohol, in ethyl ether, in chloroform and in carbon tetrachlorid; insoluble in a mixture of one part by volume of anhydrous ethyl alcohol and one and one half parts by volume of anhydrous ethyl ether; white or pale cream colored; and possessing the property when administered to animals in doses so small as to be of negligible nutritive value, of definitely influencing their growth and nutrition and of influencing in a definite manner the functions related to or involving the growth or repair or multiplication or nutrition of living cells or tissues, such influence being evidenced in part by the retardation of the growth or multiplication of certain tissues or cells, and acceleration of the growth or multiplication of certain other tissues or cells.

In testimony whereof I have signed my name to this specification in the presence of two subscribing witnesses.

THORBURN BRAILSFORD ROBERTSON.

Witnesses:
 WM. F. BOOTH,
 D. B. RICHARDS.